United States Patent [19]
Byrn et al.

[11] Patent Number: 5,737,638
[45] Date of Patent: Apr. 7, 1998

[54] SYSTEM FOR DETERMINING PLURALITY OF DATA TRANSFORMATIONS TO BE PERFORMED UPON SINGLE SET OF DATA DURING SINGLE TRANSFER BY EXAMINING COMMUNICATION DATA STRUCTURE

[75] Inventors: Jonathan W. Byrn; Gary S. Delp; Philip L. Leichty; Robert J. Manulik, all of Rochester; Arthur J. Meyer, III; Albert A. Slane, both of Oronoco, all of Minn.

[73] Assignee: International Business Machines Corporation, Armonk, N.Y.

[21] Appl. No.: 502,782

[22] Filed: Jul. 14, 1995

[51] Int. Cl.⁶ .............................. G06F 3/00; G06F 15/16
[52] U.S. Cl. ........................ 395/888; 395/882; 395/885; 395/611
[58] Field of Search ........................... 395/882, 885, 395/888, 611, 250

[56] References Cited

U.S. PATENT DOCUMENTS

| 4,456,970 | 6/1984 | Catiller et al. | 364/900 |
| 4,598,411 | 7/1986 | Berkovich et al. | 375/27 |
| 5,189,667 | 2/1993 | Esaki et al. | 370/60 |
| 5,235,644 | 8/1993 | Gupta et al. | 380/48 |
| 5,276,898 | 1/1994 | Kiel et al. | 395/800 |
| 5,303,344 | 4/1994 | Yokoyama et al. | 395/200 |
| 5,363,207 | 11/1994 | Yoshihara et al. | 358/442 |
| 5,369,755 | 11/1994 | Berkovich | 395/500 |
| 5,617,541 | 4/1997 | Albanese et al. | 395/200.13 |

FOREIGN PATENT DOCUMENTS

| 0473102A2 | 8/1991 | European Pat. Off. . |
| 0572146A2 | 5/1993 | European Pat. Off. . |
| 4028982A1 | 3/1992 | Germany . |
| 3-268666 | 11/1991 | Japan . |

Primary Examiner—Thomas C. Lee
Assistant Examiner—Rehana Perveen
Attorney, Agent, or Firm—Andrew J. Dillon

[57] ABSTRACT

A method and apparatus are disclosed for providing an inline data service within a data processing system coupled to a communications network. The data processing system includes a host memory. According to the present invention, the apparatus comprises an adapter memory for temporarily storing data communicated between the data processing system and the communications network and a memory access controller, which controls transfers of data between the adapter memory and the host memory. The apparatus further includes means for selectively performing a data transformation on data transferred between the adapter memory and the host memory, wherein the data transformation is performed during a transfer of the data such that data communication latency is reduced. In a second preferred embodiment of the present invention, a multibus data processing system has a processor and a first memory coupled to a first bus and a second memory coupled to a second bus. A bridge adapter, including means for transferring data from the first memory to the second memory and means for selectively performing a data transformation, is coupled between the first and second buses. During transfers of data from the first memory to the second memory, the bridge adapter selectively performs data transformations on the data, such that data processing latency is reduced.

36 Claims, 7 Drawing Sheets

SYSTEM FOR DETERMINING PLURALITY OF DATA TRANSFORMATIONS TO BE PERFORMED UPON SINGLE SET OF DATA DURING SINGLE TRANSFER BY EXAMINING COMMUNICATION DATA STRUCTURE

BACKGROUND OF THE INVENTION

1. Technical Field

The present invention relates in general to a method and apparatus for data processing and in particular to a method and apparatus for processing data within a data processing system. Still more particularly, the present invention relates to a method and apparatus for providing an inline data service within a data processing system.

2. Description of the Related Art

Some state-of-the-art data processing systems which support data communication include either software or hardware facilities to provide data services. Data services include error detection operations, such as TCP/IP checksum, as well as data transformations, such as encryption and compression. Within commercially available data processing systems, data services are typically performed either by data communications software running on a processor or by a coprocessor.

Figure 7:
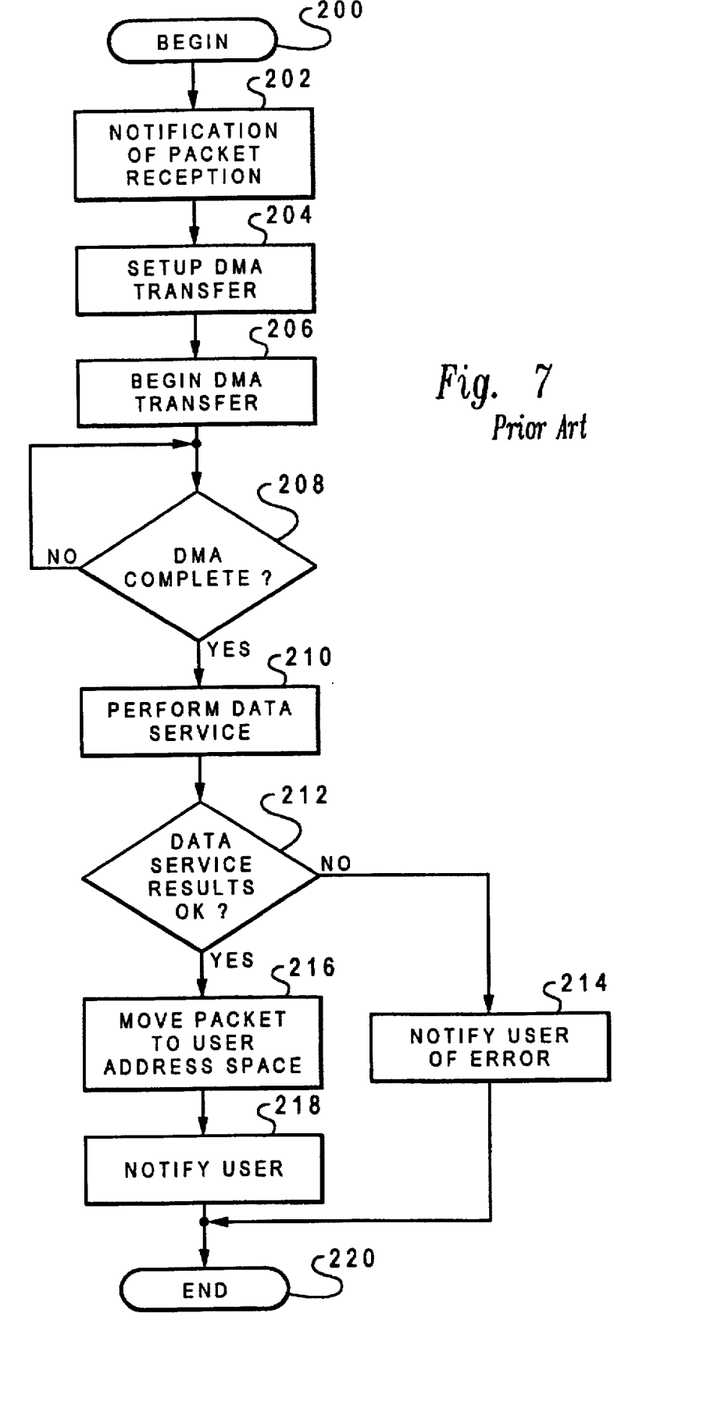
FIG. 7 is a flowchart illustrating a prior art method for performing data services upon a packet of data received at a host data processing system from a communications network.

With reference now to FIG. 7, there is illustrated a flowchart of a conventional method for implementing a data service when data is received at a data processing system from a communications network. As illustrated, the process begins at block 200 and thereafter proceeds to block 202, which depicts an input/output (I/O) adapter coupled to the communications network notifying communications software running on the processor that a data packet has been received from the communications network. The process then proceeds to block 204, which illustrates the communications software setting up a direct memory access (DMA) transfer of data from the I/O adapter to host address space within the data processing system. Next, the process proceeds to block 206, which depicts initiating the DMA transfer. As illustrated by block 208, the process then waits for the DMA transfer to complete. As will be appreciated by those skilled in the art, the DMA transfer typically stores the data within a contiguous range of addresses within the host address space. However, these virtual memory addresses are typically mapped to multiple noncontiguous address ranges in physical memory.

Following the completion of the DMA transfer, the data service is performed upon the data stored within the host memory. For example, at block 210 the communications software could perform a data transformation such as decompression or decryption by executing a code loop. Because the data service is performed by communications software running on the processor, overall data processing system performance is degraded due to the consumption of processor cycles by the performance of the data service. Performance can also be adversely affected by the scattering of the data since the communications software must gather the data from within various discontiguous physical memory locations to perform the data service. Following the completion of the data service, a determination is made at block 212 whether the data resulting from the data service includes an error. If an error is detected, the process proceeds to block 214, which depicts notifying a user that an error has occurred. If, however, no error is detected within the results of the data service, the process proceeds to block 216, which illustrates transferring the data from the host address space to user address space within the data processing system. Finally, the user is notified that the data is available at block 218. Thereafter, the process terminates at block 220.

A major disadvantage of the conventional method for providing a data service is the degradation of communications system throughput due to performing the data service following the DMA transfer of data to the host memory. To enhance communications system throughput, some prior art systems, such as that disclosed in European Patent Application 0473102A2 to Gonia, suggest the benefit of computing a checksum in parallel with the DMA transfer. However, prior art systems do not address the problems associated with data transformation data services, such as encryption and compression, which alter the content and length of the data. Furthermore, the prior art does not disclose selectively performing one of a number of data services upon data received from a communications network.

Consequently, it would be desirable to provide an improved method and apparatus for providing an inline data service. In particular, it would be desirable to provide an improved method and apparatus for performing inline data services which modify the data on which the data service is performed.

SUMMARY OF THE INVENTION

It is therefore one object of the present invention to provide an improved method and system for data processing.

It is another object of the present invention to provide an improved method and system for data communication within a data processing system.

It is yet another object of the present invention to provide an improved method and system for providing an inline data service within a data processing system.

The foregoing objects are achieved as is now described. A method and apparatus are disclosed for providing an inline data service within a data processing system coupled to a communications network. The data processing system includes a host memory. According to the present invention, the apparatus comprises an adapter memory for temporarily storing data communicated between the data processing system and the communications network and a memory access controller, which controls transfers of data between the adapter memory and the host memory. The apparatus further includes means for selectively performing a data transformation on data transferred between the adapter memory and the host memory, wherein the data transformation is performed during a transfer of the data such that data communication latency is reduced. In a second preferred embodiment of the present invention, a multibus data processing system has a processor and a first memory coupled to a first bus and a second memory coupled to a second bus. A bridge adapter, including means for transferring data from the first memory to the second memory and means for selectively performing a data transformation, is coupled between the first and second buses. During transfers of data from the first memory to the second memory, the bridge adapter selectively performs data transformations on the data, such that data processing latency is reduced.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
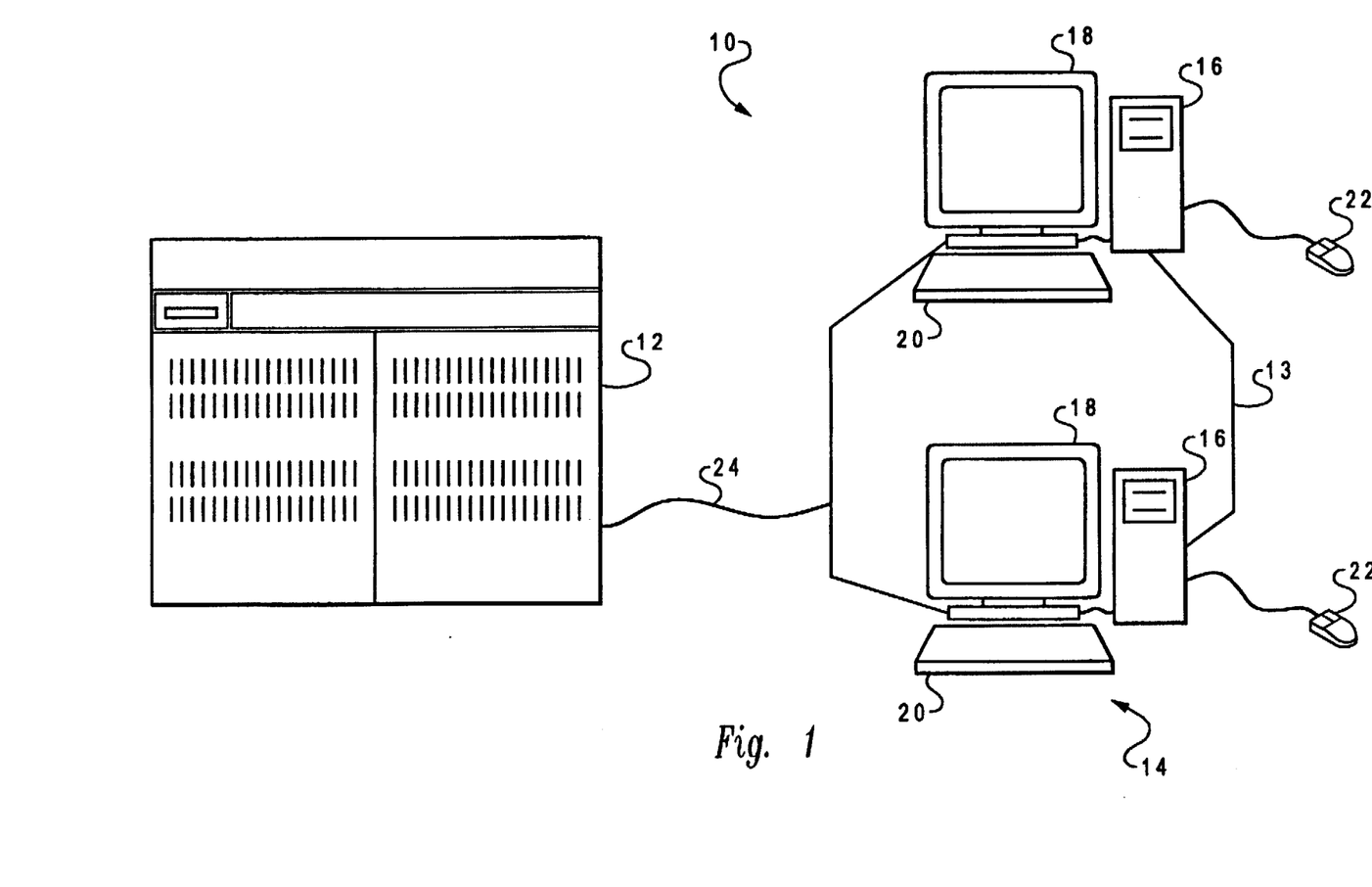
FIG. 1 illustrates a preferred embodiment of a data processing system utilizing the method and system of the present invention.

With reference now to the figures and in particular with reference to FIG. 1, there is illustrated a pictorial representation of a data processing system 10 which may be utilized to implement the method of the present invention. In the depicted embodiment, data processing system 10 includes server 12 and one or more clients 14. Each client 14 comprises a personal computer 16, display device 18, keyboard 20, and mouse 22. As is well-known to those skilled in the art, a user can input data to personal computer 16 utilizing keyboard 20, mouse 22, or other suitable input device. The user may then process data locally utilizing personal computer 16, or transmit the data from personal computer 16 to another client 14 across local area network (LAN) 13 utilizing conventional networking techniques. Similarly, a user can transmit tasks to server 12 across communications link 24. It is advantageous for a user to send tasks to server 12 for execution since server 12 can perform tasks in a relatively short period of time compared with one of clients 14.

As will be appreciated by those skilled in the art, communications link 24 and LAN 13 utilize an implementation-specific communications protocol, which in a preferred embodiment of the present invention comprises the asynchronous transfer mode (ATM) protocol. According to the ATM protocol, each packet of information transmitted via communications link 24 or LAN 13 is subdivided into a number of fixed-length cells. For example, in some implementations of the ATM protocol, each cell includes 48 bytes of cell data and an associated 5 byte cell header which describes the contents of the cell. Because each packet of information is subdivided into a number of discrete cells, multiple packets can be transmitted simultaneously across a network by interleaving cells from each of the multiple packets, thereby achieving high network throughput.

Figure 2:
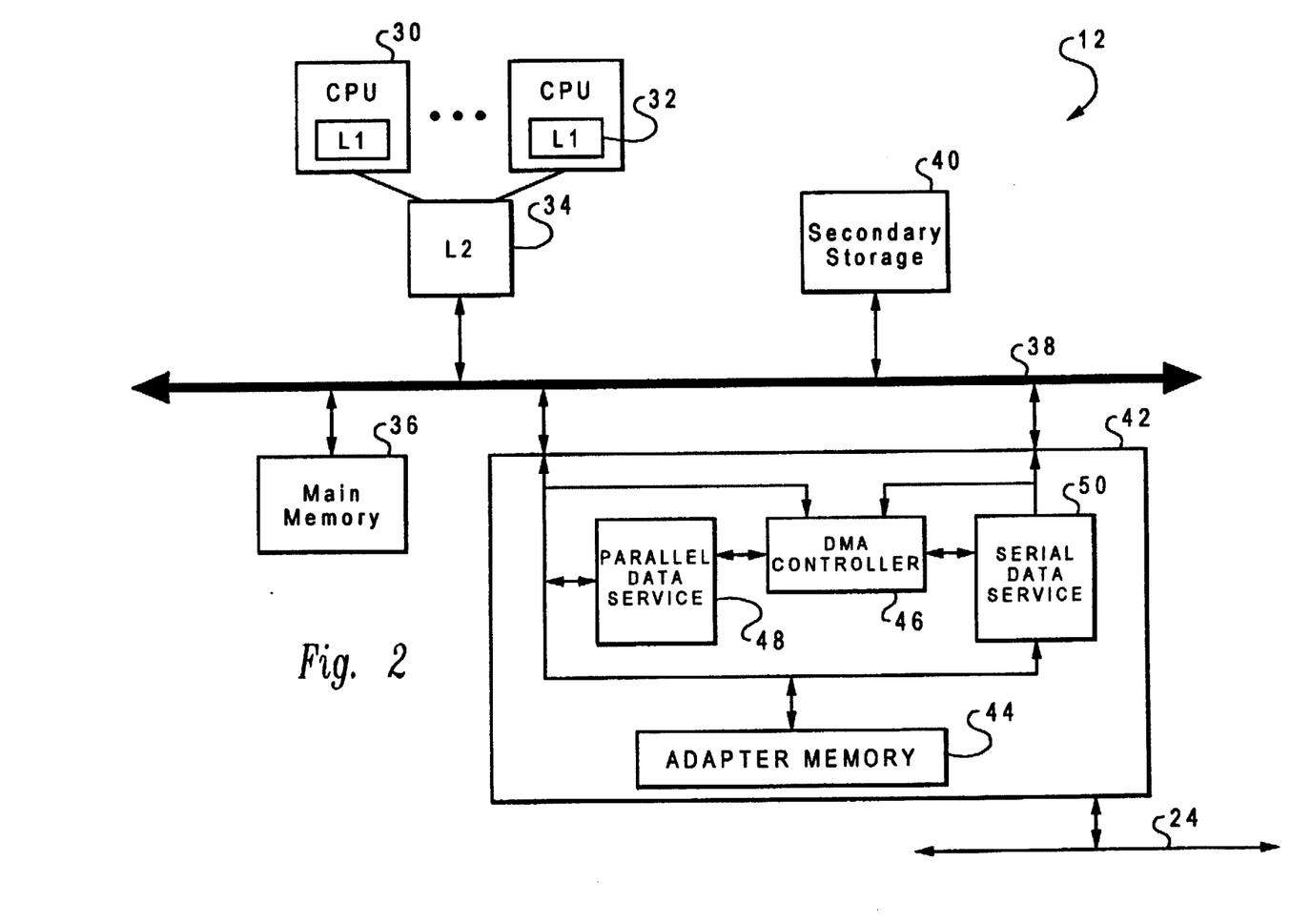
FIG. 2 depicts a block diagram of the server illustrated in FIG. 1.

Referring now to FIG. 2, there is depicted a block diagram of server 12, which in a preferred embodiment of the present invention comprises a multiprocessor computer, such as the IBM RISC System/6000. As illustrated, server 12 includes one or more CPUs 30, which preferably run under a multithreaded operating system such as AIX (Advanced Interactive Excecutive), the IBM version of UNIX. According to the present invention, CPUs 30 also execute communications software which controls data communication between server 12 and communications link 24. Under AIX each of CPUs 30 concurrently executes a thread (i.e., a schedulable stream of instructions) of an operating system or user (communications software) process.

As depicted, each of CPUs 30 has an on-board level one (L1) cache 32 and an associated level two (L2) cache 34. As will be appreciated by those skilled in the art, L1 caches 32 and L2 cache 34 comprise relatively small, fast portions of physical memory that store frequently accessed data and instructions. When data or instructions requested by one of CPUs 30 is not resident within the processor's L1 cache 32 or L2 cache 34, CPU 30 accesses the requested data or instructions from main memory 36 or secondary storage 40 via system bus 38. Addresses within the address space of server 12 are mapped to the memory hierarchy comprising L1 caches 32, L2 cache 34, and main memory 36 by a memory manager (not illustrated). As is typical of many computer networks employing a server/client topology, the address space of server 12 is bifurcated between a global host (operating system) address space and a user address space.

Server 12 also includes packet-based input/output (I/O) adapter 42, which is coupled between system bus 38 and communications link 24 to facilitate data communication between server 12 and clients 14. As a packet-based adapter, I/O adapter 42 includes adapter memory 44, which is capable of storing one or more packets of information. In addition, I/O adapter 42 has an on-board DMA controller 46 that manages DMA transfers between host memory and adapter memory 44. DMA controller 46 arbitrates between I/O adapter 42 and other "intelligent" devices (not illustrated) for ownership of system bus 38. Like many conventional DMA controllers, DMA controller 46 includes a source address register and a destination address register utilized to specify the source and destination addresses for a DMA transfer. In addition, DMA controller 46 contains a transfer count register that is loaded with the length of a DMA transfer. During the DMA transfer, DMA controller 46 decrements the transfer count register until the transfer count reaches zero, indicating that the DMA transfer is complete. According to a preferred embodiment of the present invention, DMA controller 46 also provides a base address register which enables either the source or destination address for a DMA transfer to be calculated relative to a base address. The preferred embodiment of DMA controller 46 further includes a flag register that stores DMA settings specified within a DMA control block, which is described in greater detail below.

According to the present invention, I/O adapter 42 further includes parallel data service unit (DSU) 48 and serial data service unit (DSU) 50. DSUs 48 and 50 provide data services for data received by I/O adapter 42 from communications link 24, as well as data transmitted from host memory through I/O adapter 42 to communications link 24. The parallel data services supported by parallel DSU 48 include operations which do not modify the data, but merely utilize the data to perform functions such as a cyclic redundancy check (CRC) or checksum accumulation. In contrast, serial DSU 50 selectively performs reversible data transformations which modify the contents and/or length of the data.

DSUs 48 and 50 are independently operable and can simultaneously perform a number of data services on a packet of information. For example, parallel DSU 48 can calculate the checksum of packet data within a packet of information while serial DSU 50 performs serial data services on the packet data, such as compression and encryption. As will be described in greater detail below, because data services are performed by DSUs 48 and 50 on a packet of information during a DMA transfer of the packet between host memory and adapter memory 44, the time required to perform the data services is minimized. In addition, since the data services are performed at a point in the data path where data converges (i.e., the DMA data path), data communication performance is enhanced over prior art systems which must gather data stored in discontinuous segments of physical memory prior to performing a data service. Although illustrated in FIG. 2 as hardware logic, those skilled in the art will appreciate that parallel DSU 48 and serial DSU 50 could also be implemented as software or firmware within I/O adapter 42.

As will be appreciated by those skilled in the art, system unit 12 includes additional devices which are not necessary for an understanding of the present invention and are accordingly omitted from FIG. 2 for the sake of simplicity.

Figure 3:
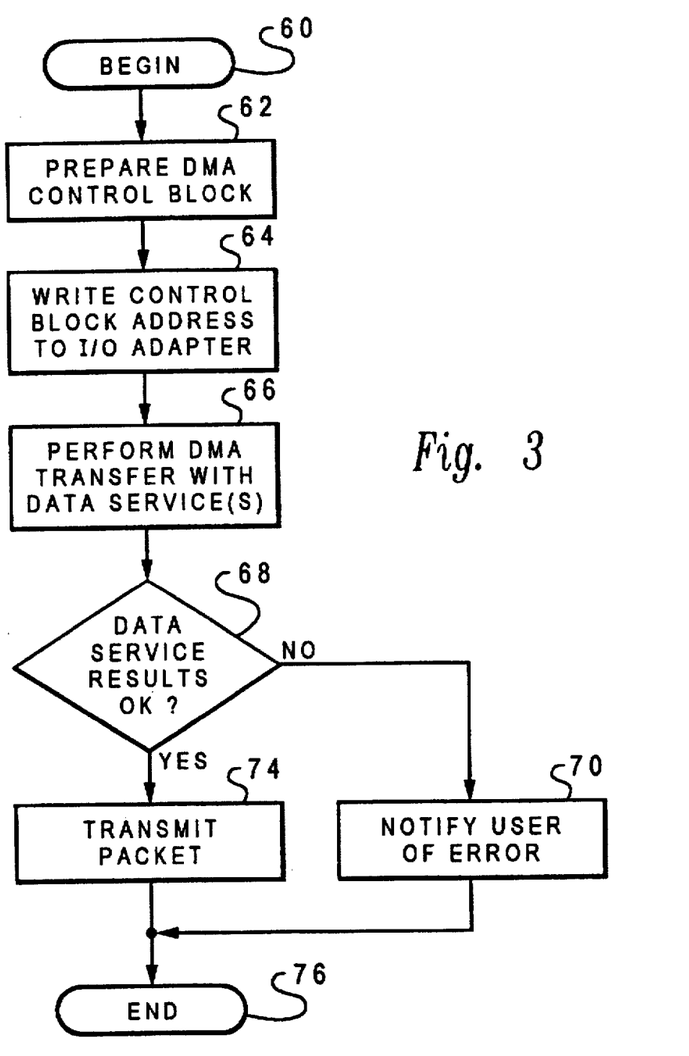
FIG. 3 is a flowchart illustrating a method according to a preferred embodiment of the present invention for providing inline data services prior to transmitting data from a host data processing system to a communications network.

With reference now to FIG. 3, there is illustrated a flowchart of the method for performing a data service on data transmitted from a data processing system to a communications network according to a preferred embodiment of the present invention. As the process begins at block 60, a packet of information to be transmitted from server 12 to communications link 24 is stored within the host address space of server 12. The process proceeds from block 60 to block 62, which depicts communications software executing within server 12 constructing a DMA control block which specifies parameters of a DMA transfer of the packet of information from the host address space to adapter memory 44. To determine the parameters utilized to construct the DMA control block, the header of the packet of information is interrogated. Information gleaned from the packet header is then decoded to locate a communications control block that indicates data services to be performed upon the packet data. The communications control block may also contain an encryption seed, encryption keys, or other additional data service information. Thereafter, the communications software develops the DMA parameters specified within the DMA control block utilizing information within the communications control block.

Figure 4:
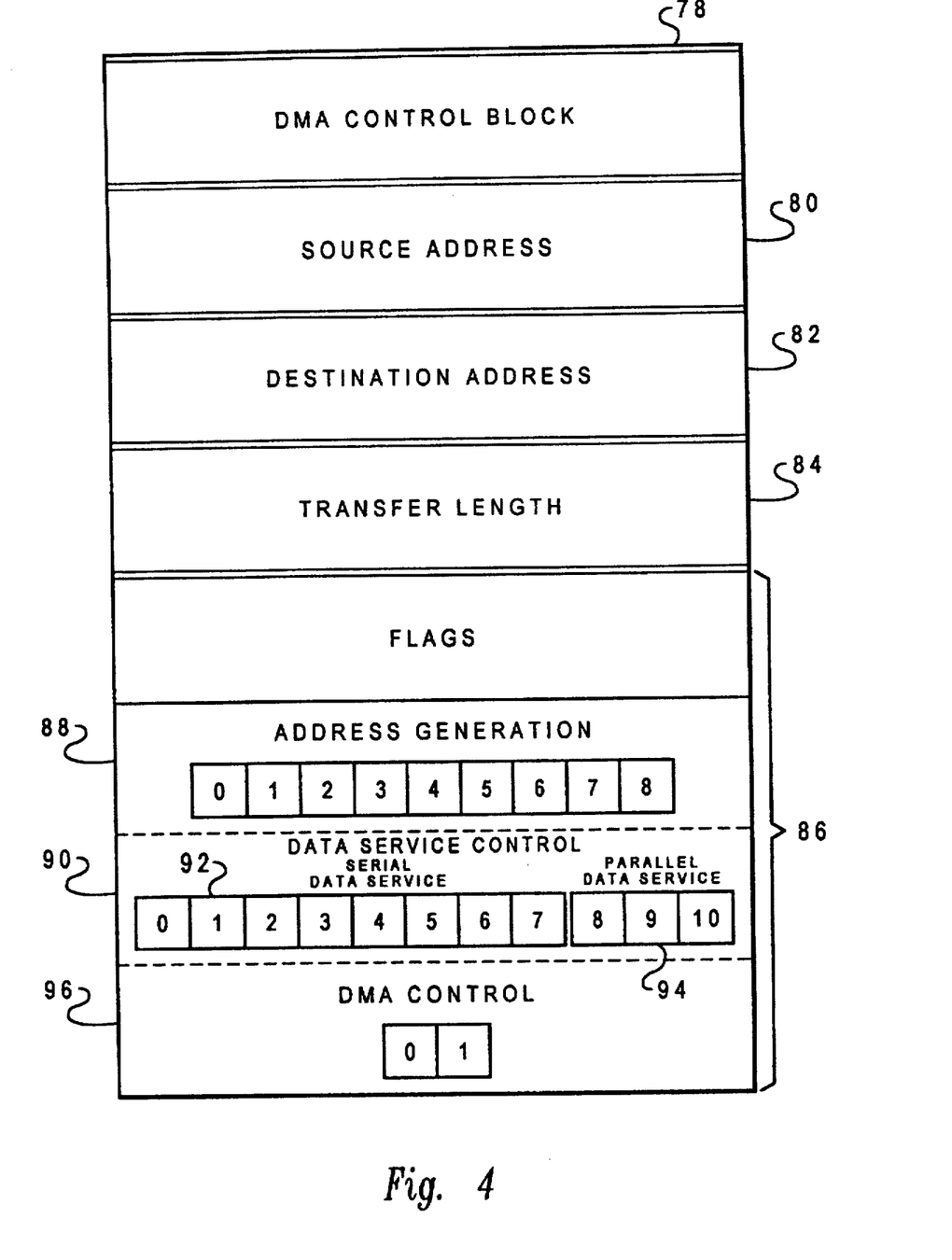
FIG. 4 depicts a preferred embodiment of a DMA control block utilized to specify data services to be performed upon data transferred from host memory to the adapter memory.

Referring now to FIG. 4, there is depicted a preferred embodiment of a DMA control block. As illustrated, DMA control block 78 includes source address field 80, destination address field 82, transfer length field 84, and flag field 86. Fields 80-84 indicate the source and destination addresses of the packet of information within either host memory or adapter memory 44, and the length of the packet of information, respectively. Flag field 86 includes address generation flags 88, data service control flags 90, and DMA control flags 96. The settings of address generation flags 88 control how the contents of source address field 80, destination address field 82, and transfer length field 84 are utilized within the DMA transfer. For example, setting both of flags 0 and 1 within address generation flags 88 specifies that the contents of source address field 80 and destination address field 82 are absolute addresses which are to be incremented by a word length after the transfer of each addressable data word. In contrast, setting flags 7 and 8 within address generation flags 88 specifies that the contents of source address field 80 and destination address field 82 are offsets utilized to calculate relative source and destination addresses with respect to the base address stored within DMA controller 46. Alternatively, address generation flags 88 within DMA control block 78 support indirect addressing. Setting flags 5 and 6 indicates to DMA controller 46 that the source and destination addresses are contained within host memory or adapter memory, depending upon the addresses specified within source address field 80 and destination address field 82. The DMA transfer parameters specified by each of address generation flags 88 is detailed below in Table 1.

TABLE 1

| Address Generation Flags | | |
|---|---|---|
| 0 | Auto Increment Source Address | Increment source address by a word length following each transfer |
| 1 | Auto Increment Destination Address | Increment destination address by a word length following each transfer |
| 2 | Source Address As Data | Interpret source address field contents as data |
| 3 | Transfer Length to Count Source Bytes | Transfer length specifies length prior to data services |
| 4 | Transfer Length to Count Destination Bytes | Transfer length specifies length subsequent to data services |
| 5 | Host or Adapter Source Address Indicator | Find the source address within the address range specified within the source address field |
| 6 | Host or Adapter Destination Address Indicator | Find the destination address within the address range specified within the destination address field |
| 7 | Source Address is Offset | Utilize contents of source address field as an offset from base address register |
| 8 | Destination Address is Offset | Utilize contents of destination address field as an offset from base address register |

Flag field 86 also includes data service control flags 90, which comprise serial data service flags 92 and parallel data service flags 94. Settings of serial data service flags 92 and parallel data service flags 94 specify which of a number of serial and parallel data services are to be performed during the DMA transfer. In the preferred embodiment depicted in FIG. 4, the serial data services performed by serial DSU 50 include big endian to little endian conversion, encryption and decryption, compression and decompression, and byte stuffing and unstuffing.

As utilized herein, byte stuffing denotes a method of achieving transparency through a link connection by modifying selected data patterns. In other words, because nodes within a network may differ in the set of control characters they recognize and act upon, byte stuffing may be required to ensure that data is not wrongly interpreted by a node as a control character. For example, a modem receiving a packet of information may interpret a particular string of information within the packet as an end-of-transmission flag. In order to prevent the modem from disconnecting as soon as the string of characters is received, byte stuffing is performed prior to transmission of the packet of information to disguise the string of characters by either altering particular bits within the string or by inserting control characters adjacent to the string to prevent the modem from recognizing them.

The implementation of the parallel data services provided by parallel DSU 48 are controlled by the settings of parallel data service flags 94. In the depicted embodiment of the present invention, the parallel data services include accumulating a checksum, a CRC-10, and a CRC-32. The functions controlled by data service control flags 90 are described below in Table 2.

TABLE 2

Data Service Control Flags

| | | |
|---|---|---|
| 0 | Big Endian/Little Endian Byte Swap | Convert data words from big to little endian data convention by reversing byte order |
| 1 | Big Endian/Little Endian Byte Reflect | Convert each byte from big to little endian data convention by reversing bit order |
| 2 | Byte Stuff | Perform byte stuffing |
| 3 | Byte Unstuff | Perform byte unstuffing |
| 4 | Encrypt | Encrypt packet data |
| 5 | Decrypt | Decrypt packet data |
| 6 | Compress | Compress packet data |
| 7 | Decompress | Decompress packet data |
| 8 | Checksum | Accumulate checksum |
| 9 | CRC-10 | Accumulate CRC-10 |
| 10 | CRC-32 | Accumulate CRC-32 |

Finally, as depicted below in Table 3, flag field 86 includes DMA control flags 96, which determine whether the packet of information is queued for transmission following the completion of the DMA transfer or whether transmission of the packet of information is inhibited.

TABLE 3

DMA Control Flags

| | |
|---|---|
| 0 | Queue on DMA Completion |
| 1 | Inhibit on DMA Completion |

Returning to FIG. 3, after the DMA control block is constructed at block 62, the process proceeds to block 64, which illustrates the communications software writing the base address of the DMA control block into I/O adapter 42. Utilizing the information within the DMA control block, DMA controller 46 then performs a DMA transfer of the packet of information from host address space to adapter memory 44 at block 66. As the packet of information is being transferred, parallel DSU 48 and serial DSU 50 perform the data services indicated by data service control flags 90 within DMA control block 78. As will be appreciated by those skilled in the art, in other embodiments of the present invention DMA control block 78 can be expanded to contain indications of portions of the packet data upon which data services are to be performed. For example, in another preferred embodiment, the DMA control block may contain additional flags and fields to indicate that the first 40 bytes of packet data are to be transmitted without performing a serial data service and the remaining bytes are to be compressed. Alternatively, multiple DMA control blocks can be chained together to enable different data services to be selectively performed on each portion of packet data.

Next, a determination is made at block 68 whether an error occurred during the DMA transfer of the packet of information to adapter memory 44. If an error occurred during the DMA transfer, the process proceeds to block 70, which depicts notifying a user that a communication error has occurred. The process then terminates at block 76. Returning to block 68, if an error is not detected during the DMA transfer, the process proceeds to block 74, which illustrates I/O adapter 42 transmitting the packet of information from adapter memory 44 across communications link 24 to another node within data processing system 10. Thereafter, the process terminates at block 76.

Figure 5:
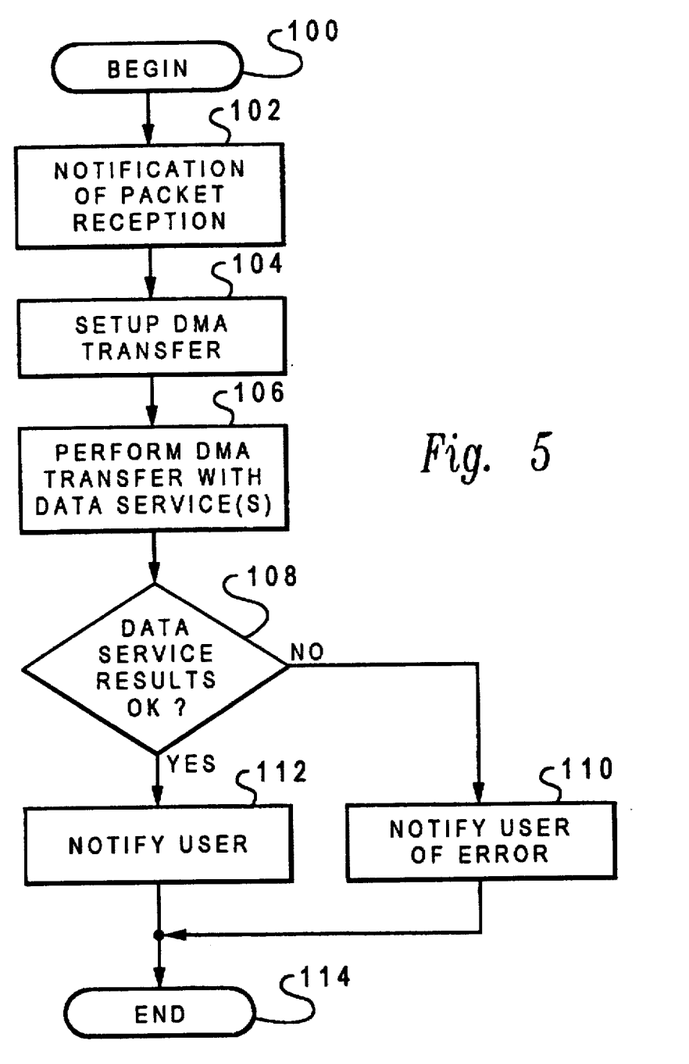
FIG. 5 is a flowchart illustrating a method according to a preferred embodiment of the present invention for providing inline data services following reception of data from a communications network at a host data processing system.

With reference now to FIG. 5, there is illustrated a flowchart of the method for performing data services on a packet of information received by a data processing system according to a preferred embodiment of the present invention. As the process begins at block 100, a packet of information is being received from communications link 24 at adapter memory 44. The process proceeds from block 100 to block 102, which depicts I/O adapter 42 notifying the communications software running on server 12 that at least a portion of a packet of information has been received.

Next, the process proceeds to block 104, which illustrates the communications software setting up a DMA transfer of the packet of information from adapter memory 44 to the host address space of server 12. According to a preferred embodiment of the present invention in which data processing system 10 employs the ATM protocol, each cell of a packet of information includes a cell header containing a virtual circuit identifier that provides information characterizing the communications connection. Utilizing the virtual circuit identifier, the communications software or I/O adapter hardware locates a communications control block, resident within either I/O adapter 42 or host address space, that indicates which data services are to be performed upon the packet of information. Utilizing information within the communications control block, the communications software or I/O adapter hardware instructs DMA controller 46 which data services are to be performed during a DMA transfer of the packet of information. In an alternative embodiment of the present invention in which ATM cell headers contain insufficient information to locate the communications control block or in which a different communications protocol is employed, the communications software decodes information within the packet header to ascertain the location of the communications control block. Thus, in either embodiment, the data services performed upon a packet of information received by server 12 are configurable on a connection basis utilizing information embedded within the packet of information. Of course, in less sophisticated environments, the data service can simply be specified by the communications software.

Next, the process proceeds to block 106, which depicts I/O adapter 42 performing the DMA transfer of the data from adapter memory 44 to host address space within server 12. During the DMA transfer, parallel DSU 48 and serial DSU 50 perform the data services indicated within the communications control block upon the packet of information. The process proceeds from block 106 to block 108, which depicts making a determination whether an error occurred during the DMA transfer of the packet of information. If an error occurred during the transfer, the process proceeds to block 110, which illustrates notifying the user that a communication error has occurred. The process then terminates at block 114. Returning to block 108, if an error does not occur during the DMA transfer, the process proceeds to block 112, which depicts notifying the user that the packet of information is accessible within host memory. Thereafter, the process terminates a block 114.

Figure 6:
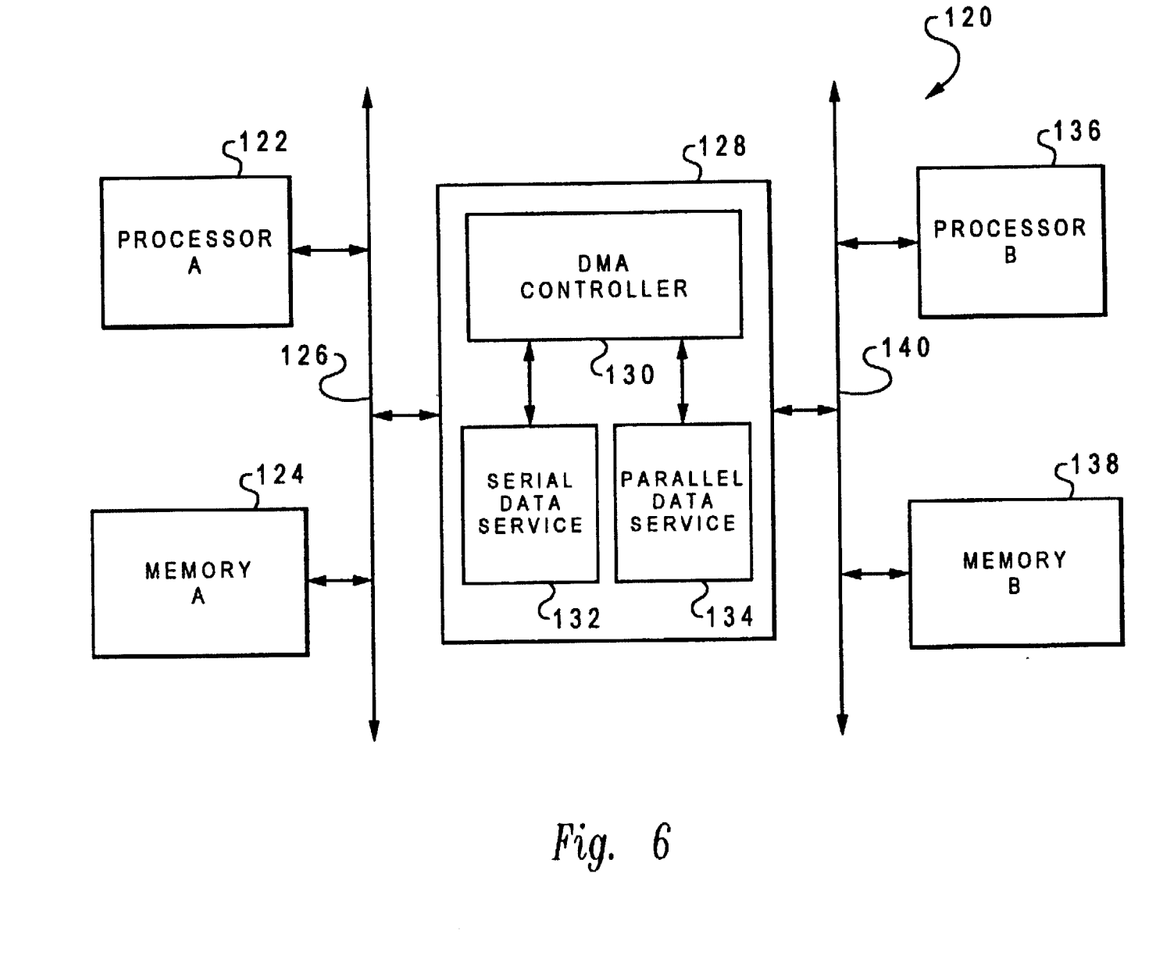
FIG. 6 depicts a second preferred embodiment of a data processing system which implements the present invention within a bridge chip linking two buses within the data processing system.

Referring now to FIG. 6, there is depicted a second preferred embodiment of the present invention in which data services are implemented within a discrete "bridge" chip linking two buses within a multibus data processing system. Multibus data processing system 120 includes processor A 122 and memory A 124, which are coupled by bus 126, as well as processor B 136 and memory B 138, which are coupled by bus 140. As illustrated, buses 126 and 140 are linked by bridge chip 128, which facilitates data communication between buses 126 and 134. Like I/O adapter 42 illustrated in FIG. 2, bridge chip 128 has an on-board DMA controller 130 for managing transfers of data between memory A 124 and memory B 138. In addition, bridge chip 128 includes serial DSU 132 and parallel DSU 134 for selectively performing data services upon data transferred between memory A 124 and memory B 138.

A data transfer between memory A 124 and memory B 138 is initiated by processor A 122 or processor B 136 writing source and destination addresses of the data transfer into registers within DMA controller 130. In response to initiation of a data transfer, DMA controller 130 transfers data from a specified source address within one of memory A 124 and memory B 138 to a specified destination address within the other memory. According to the present invention, one or more parallel and serial data services specified by the initiating processor are selectively performed on the data during the data transfer.

As has been described, the present invention provides an improved method and system for providing inline data services. According to the present invention, the application of data services is selectively controlled through the utilization of an information encapsulated within each packet of information. Because the data services are performed within the DMA data path during a DMA transfer, the present invention minimizes data communication latency. Furthermore, overall data processing system performance is enhanced since the performance of the data services does not consume processor cycles.

While the invention has been particularly shown and described with reference to a preferred embodiment, it will be understood by those skilled in the art that various changes in form and detail may be made therein without departing from the spirit and scope of the invention.

What is claimed is:

1. An apparatus for providing an inline data service within a data processing system coupled to a communications network, said data processing system including a host memory, said apparatus comprising:
   an adapter memory for temporarily storing data communicated between said data processing system and said communications network;
   a memory access controller that controls transfers of data between said adapter memory and said host memory, said memory access controller including:
      means for determining a plurality of data transformations to be performed upon a single set of data during a single transfer of said single set of data between said adapter memory and said host memory wherein said means for determining a plurality of data transformations to be performed upon said single set of data includes means for examining a communication data structure that specifies said plurality of data transformations, wherein a storage location of said communication data structure is indicated by information within said single set of data; and
      means for selectively performing said plurality of data transformations on said single set of data during a single transfer of said single set of data between said adapter memory and said host memory such that data communication latency is reduced.

2. The apparatus for providing an inline data service of claim 1, said single set of data including a plurality of packets, said apparatus further comprising:
   means for determining during said single transfer of said single set of data whether a particular packet of data transferred between said adapter memory and said host memory includes an error; and
   means for indicating that a communication error has occurred in response to a determination that said particular packet of data includes an error.

3. The apparatus for providing an inline data service within a data processing system of claim 2, wherein said means for determining whether a particular packet of data includes an error comprises means for calculating a sum based upon said particular packet of data to determine whether said single set of data includes an error.

4. The apparatus for providing an inline data service within a data processing system of claim 1, said plurality of data transformations comprising at least one of encryption and decryption.

5. The apparatus for providing an inline data service within a data processing system of claim 1, said plurality of data transformations comprising alteration of only particular control characters within said single set of data according to a predetermined rule.

6. The apparatus for providing an inline data service within a data processing system of claim 4, said plurality of data transformations further comprising at least one of compression and decompression.

7. A method for providing an inline data service within a data processing system coupled to a communications network, said data processing system having a host memory, a communications adapter and an adapter memory, said method comprising:
   determining a plurality of data transformations to be performed upon said single set of data during a single transfer of said single set of data between said adapter memory and said host memory wherein said step of determining a plurality of data transformations to be performed upon said single set of data includes the step of examining a communication data structure that specifies said plurality of data transformations, wherein a storage location of said communication data structure is indicated by information within said single set of data;
   performing a single transfer of said single set of data between said adapter memory and said host memory; and
   selectively performing said plurality of data transformations upon said single set of data during said single transfer of said single set of data between said adapter memory and said host memory, such that data communication latency is reduced.

8. The method for providing an inline data service of claim 7, said single set of data being communicated between said adapter memory and said main memory in packets of information, wherein said step of determining a plurality of data transformations to be performed upon said single set of data comprises the step of determining a data transformation to be performed upon a particular packet of information utilizing information within said particular packet of information.

9. The method for providing an inline data service of claim 8, said particular packet of information comprising a packet header and packet data, wherein said step of determining a plurality of data transformations to be performed comprises the step of examining said communication data structure within said host memory that specifies a data transformation to be performed upon said packet data, wherein said location of said communication data structure within said host memory being indicated by information within said packet header.

10. The method for providing an inline data service of claim 8, wherein packets of information are communicated between said communications network and said data processing system utilizing a communications protocol that subdivides each packet of information into a plurality of discrete cells of information, wherein said step of determining a plurality of data transformations to be performed comprises the step of examining a communications data structure within said host memory that specifies a data transformation to be performed upon said particular packet of information, a location of said communication data structure being indicated by information within one of a plurality of cells comprising said particular packet of information.

11. The method for providing an inline data service of claim 7, said method further comprising:

subsequent to performance of said data transformation and during said transfer of said single set of data, determining whether said particular packet of information includes an error;

in response to a determination that said particular packet of information does not include an error, indicating that said data is accessible; and in response to a determination that said particular packet of information includes an error, indicating that a communication error has occurred.

12. The method for providing an inline data service of claim 11, wherein said step of determining whether said particular packet of information includes an error comprises the step of calculating a sum based upon said packet of information.

13. The method for providing an inline data service of claim 7, wherein said step of selectively performing said plurality of data transformations comprises the step of performing at least one of encryption and decryption on said single set of data.

14. The method for providing an inline data service of claim 7, wherein said step of selectively performing said plurality of data transformations comprises the step of altering only particular control characters within said single set of data according to a predetermined rule.

15. The method for providing an inline data service of claim 13, wherein said step of selectively performing said plurality of data transformations comprises the step of performing at least one of compression and decompression on said single set of data.

16. An apparatus for providing an inline data service within a data processing system, said data processing system having a processor and a first memory coupled to a first bus and a second memory coupled to a second bus, wherein said first and said second buses are coupled by said apparatus, said apparatus comprising:

means for transferring a single set of data received from said first memory to said second memory;

means for determining a plurality of data transformations to be performed upon said single set of data during a single transfer, wherein said means for determining said plurality of data transformations to be performed upon said single set of data includes means for examining a communication data structure that specifies said plurality of data transformations, wherein a storage location of said communication data structure is indicated by information within said single set of data; and means for selectively performing said plurality of data transformations on said single set of data during said single transfer of said single set of data between said first and said second memories such that data processing latency is reduced.

17. The apparatus for providing an inline data service of claim 16, said apparatus further comprising means for calculating a sum based upon said single set of data to determine whether said single set of data includes an error.

18. The apparatus for providing an inline data service of claim 16, wherein said plurality of data transformations comprise at least one of encryption and decryption.

19. The apparatus for providing an inline data service of claim 16, wherein said plurality of data transformations comprise altering only particular control characters within said data according to a predetermined rule.

20. The apparatus for providing an inline data service of claim 18, wherein said plurality of data transformations comprise at least one of compression and decompression.

21. A method for providing an inline data service within a data processing system, said data processing system having a processor and a first memory coupled to a first bus and a second memory coupled to a second bus, wherein said first and said second buses are coupled by an adapter, said method comprising the steps of:

determining a plurality of data transformations to be performed upon a single set of data during a single transfer, wherein said step of determining said plurality of data transformations to be performed upon said single set of data includes the step of examining a communication data structure that specifies said plurality of data transformations, wherein a storage location of said communication data structure is indicated by information within said single set of data;

performing said single transfer of said single set of data from said first memory to said second memory utilizing said adapter; and during said single transfer, selectively performing said plurality of data transformations within said adapter on said single set of data transferred between said first and said second memories, such that data processing latency is reduced.

22. The method for providing an inline data service of claim 21, said method further comprising the step of calculating a sum based upon said single set of data to determine whether said single set of data includes an error.

23. The method for providing an inline data service of claim 21, wherein said step of selectively performing a plurality of data transformations comprises the step of performing at least one of encryption and decryption.

24. The method for providing an inline data service of claim 21, wherein said step of performing a plurality of data transformations comprises the step of altering only particular control characters within said single set of data according to a predetermined rule.

25. The method for providing an inline data service of claim 23, wherein said step of performing a plurality of data transformations comprises the step of performing at least one of compression and decompression.

26. The apparatus for providing an inline data service of claim 1, said single set of data being communicated between said communications network and said data processing system utilizing packets of information, wherein said means for selectively performing a plurality of data transformation performs a plurality of data transformations on a single packet of information.

27. The apparatus for providing an inline data service of claim 1, said single set of data being communicated between said communications network and said data processing system utilizing packets of information, wherein said means for determining which of said plurality of data transformations are to be performed comprises means for determining which of said plurality of data transformations are to be performed on a packet-by-packet basis.

28. The apparatus for providing an inline data service of claim 27, each packet of information including a packet header and packet data, wherein said means for determining which of said plurality of data transformations are to be performed comprises means for determining that a selected data transformation is to be performed upon packet data within a particular packet of information by examining said communications data structure located utilizing information within a packet header of said particular packet of information.

29. The apparatus for providing an inline data service of claim 27, wherein said communications network employs a communications protocol that subdivides each packet of information into a plurality of discrete cells of information, wherein said means for determining which of said plurality of data transformations are to be performed comprises means for determining a selected data transformation to be performed upon a particular packet of information by examining a communications data structure located utilizing information within one of a plurality of cells comprising said particular packet of information.

30. The method for providing an inline data service of claim 8, wherein said step of determining which of a plurality of data transformations are to be performed upon said single set of data comprises the step of determining a plurality of data transformations to be performed upon said particular packet of information.

31. The method for performing an inline data service of claim 7, wherein said step of transferring said single set of data between said adapter memory and said host memory comprises the step of transferring said single set of data from said adapter memory to said host memory.

32. The method for performing an inline data service of claim 7, wherein said step of transferring said single set of data between said adapter memory and said host memory comprises the step of transferring said single set of data to said adapter memory from said host memory.

33. The apparatus of claim 27, said single set of data including one or more packets of data including a particular packet, wherein said means for determining said plurality of data transformations performed upon said single set of data during said single transfer comprises means for determining which of said plurality of data transformations are to be performed upon said particular packet in response to information contained within said particular packet.

34. The method of claim 33, said single set of data including one or more packets of data including a particular packet, wherein said step of determining said plurality of data transformations to be performed upon said single set of data comprises the step of determining which of said plurality of data transformations are to be performed upon said particular packet in response to information contained within said particular packet.

35. The apparatus of claim 1, and further comprising at least one control block in said host memory accessible to said memory access controller and associated with said single transfer of said single set of data, said control block indicating how source and destination addresses for said single transfer are to be calculated.

36. The apparatus of claim 4, and further comprising at least one control block in said host memory accessible to said memory access controller and associated with said single transfer of said single set of data, said control block indicating at least one of an encryption key and an encryption seed.

* * * * *